Figure 1:
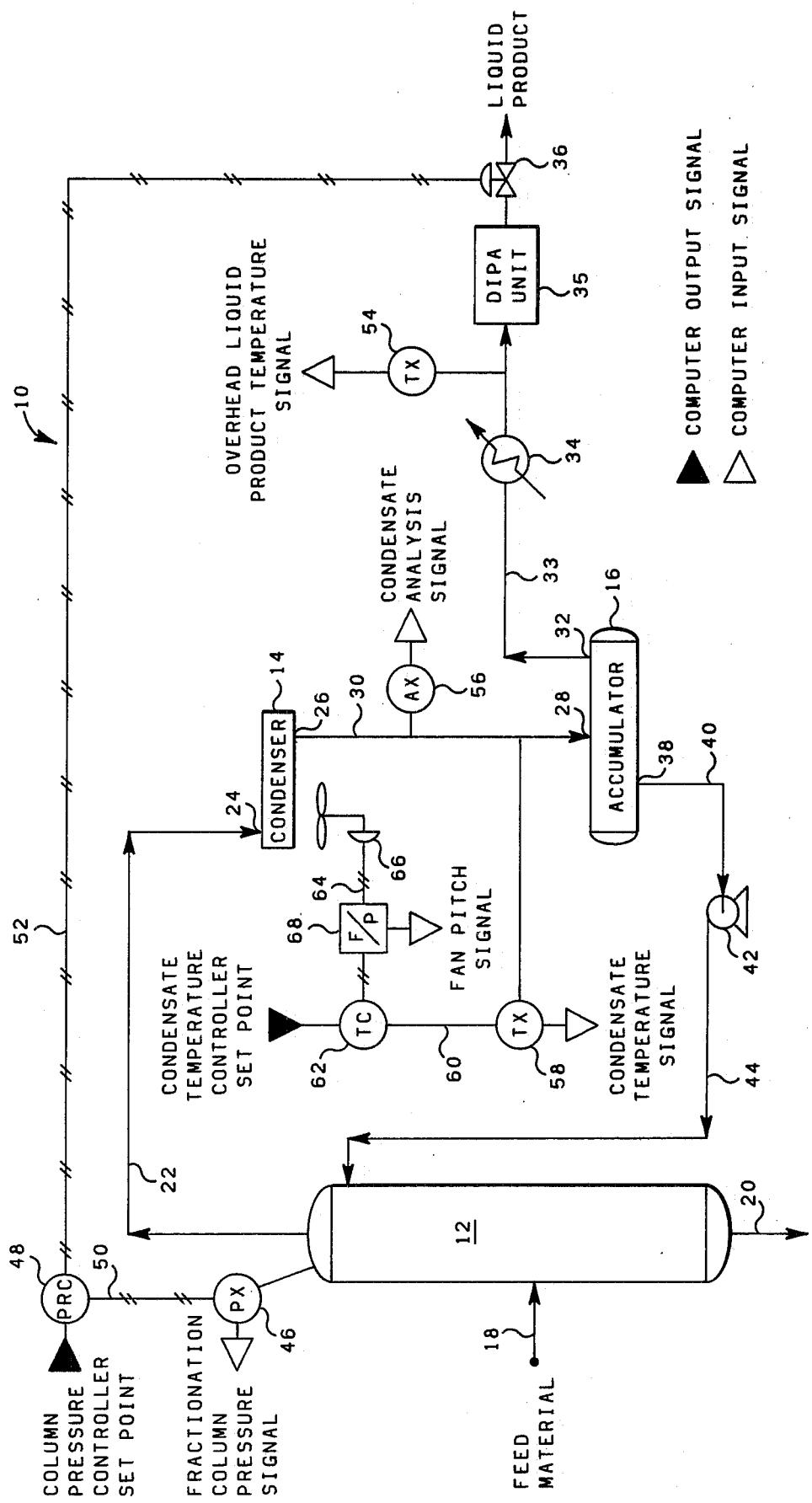

United States Patent [19]

Bard

[11] 4,167,455
[45] Sep. 11, 1979

[54] FLOATING PRESSURE CONTROL OF FRACTIONATOR SYSTEM

[75] Inventor: William B. Bard, Bartlesville, Okla.

[73] Assignee: Phillips Petroleum Co., Bartlesville, Okla.

[21] Appl. No.: 952,914

[22] Filed: Oct. 19, 1978

[51] Int. Cl.² .............................................. B01D 3/42
[52] U.S. Cl. ........................................ 203/2; 203/3; 202/160; 196/141; 364/497; 364/501
[58] Field of Search ....................................... 203/1–3, 203/DIG. 18; 202/160, 161; 196/132, 141; 62/21, 37; 364/501, 497

[56] References Cited

U.S. PATENT DOCUMENTS

| | | | |
|---|---|---|---|
| 3,039,941 | 6/1962 | Sweeney et al. | 203/2 |
| 3,090,683 | 5/1963 | Berger | 48/196 |
| 3,427,228 | 2/1969 | Constantikes et al. | 203/1 |
| 3,463,725 | 8/1969 | MacFarlane et al. | 203/3 |
| 3,619,377 | 11/1971 | Palmer | 202/160 |
| 3,826,719 | 7/1974 | Boyd et al. | 203/3 |
| 3,901,673 | 8/1975 | Zahn et al. | 62/21 |
| 3,985,623 | 10/1976 | Morgan et al. | 196/132 |
| 4,070,172 | 1/1978 | Smith et al. | 62/21 |

OTHER PUBLICATIONS

*Chemical Engineering Progress*, Jun. 1975, pp. 49–54.

*Primary Examiner*—Wilbur L. Bascomb, Jr.

[57] ABSTRACT

Method and apparatus are disclosed for the automatic adjustment of the fractionation column pressure in a fractionator system which employs total condensation of overhead vapor and a liquid full reflux accumulator to thus float the column pressure above minimum column pressure. The set point of a condensder fan pitch controller, which manipulates the blade pitch of the condenser fan, is automatically adjusted in response to a desired offset of condensate subcooling from the overhead bubble point temperature which is repeatedly automatically calculated in response to analysis of the overhead product composition and pressure. The set point of a pressure controller, which manipulates the overhead product control valve to adjust column pressure, is automatically adjusted in response to a fan pitch signal from the condenser fan pitch controller and a desired fan pitch set point. Appropriate limits and overrides are also disclosed to prevent sudden changes in column pressure which might upset system operation.

14 Claims, 2 Drawing Figures

FLOATING PRESSURE CONTROL OF FRACTIONATOR SYSTEM

This invention relates generally to process control systems. In one aspect the invention relates to a system for controlling the column pressure of a fractionation column. In another aspect the invention relates to a method of controlling the column pressure of a fractionation column. In still another aspect the invention relates to a system for controlling the subcooling of condensate at the condenser. In yet another aspect the invention relates to a method of controlling the subcooling of condensate at the condenser. In yet another aspect the invention relates to a fractionator system provided with floating pressure control of the fractionation column pressure.

In fractionator systems, the full utilization of condensing capacity allows the fractionation column to operate at the lowest possible pressure. Significant savings in reboiler heating requirements result from such full utilization since the separation of products can be made at lower internal liquid flows within the fractionation column.

There are, however, many fractionator systems employing condensers and liquid full reflux accumulators which provide no accessible indicator of condenser loading upon which adjustments of column pressure and condensate subcooling can be based to achieve operation at the lowest possible pressure.

It is therefore an object of the present invention to provide an improved fractionator system.

Another object of the invention is to provide an improved control system for use with a fractionator system.

Still another object of the invention is to provide an improved method of control of the operation of a fractionator system.

Yet another object of the invention is to provide method and apparatus for floating the fractionation column pressure above minimum column pressure.

Still another object of the invention is to provide method and apparatus for maintaining a predetermined amount of subcooling of the condensate below the bubble point thereof.

Another object of the invention is to provide method and apparatus for automatically controlling the column pressure and condensate subcooling of a fractionator system to maximize operating economy.

In accordance with the invention, the fractionation column pressure and overhead product are monitored and the bubble point of the overhead product is automatically calculated in response to these monitored values.

In response to the calculated condensate bubble point, the condensate temperature and a predetermined degrees subcooling set point, a condensate temperature controller set point is established. Fan pitch controller means manipulates the pitch of the condensenser fan blades so as to maintain a predetermined amount of condensate subcooling. Valve controller means manipulates overhead product control valve means in response to a fan pitch set point and a fan pitch signal from the fan pitch controller means so as to adjust the fractionation column pressure to an appropriate value floating above minimum column pressure.

Figure 2:
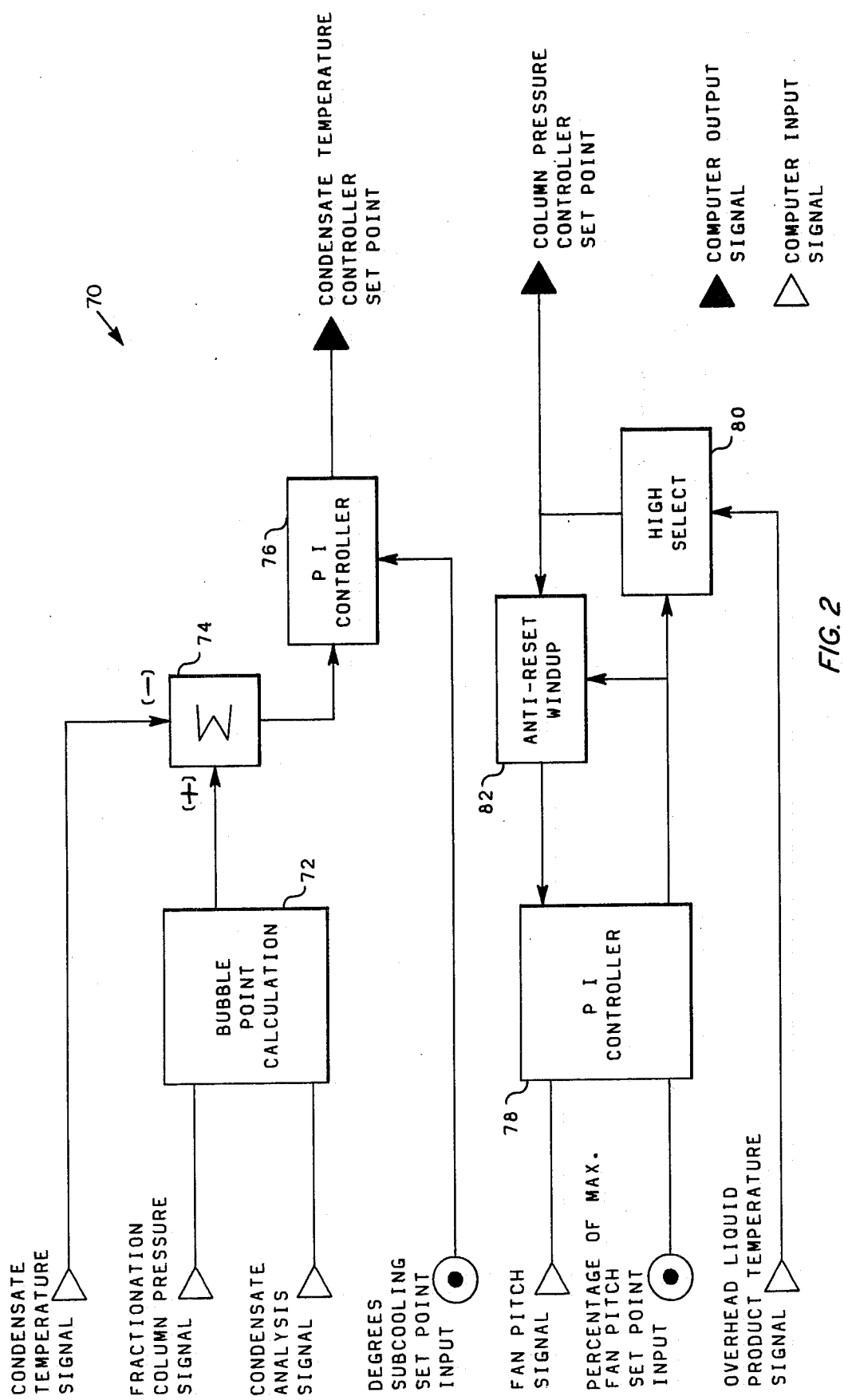

Other objects, aspects and advantages of the present invention will be readily apparent to those skilled in the art from a reading of the following detailed description and claims and accompanying drawing in which:

FIG. 1 is a diagrammatical representation of a fractionator system in accordance with the present invention; and FIG. 2 is a diagrammatical representation of a control system in accordance with the present invention.

Referring now to the drawings, and to FIG. 1 in particular, there is illustrated a fractionator system 10 comprising a conventional fractionation column 12, a condenser 14 and a reflux accumulator 16. A feed material to be fractionated is fed to the fractionation column 12 via conduit 18. A bottom product stream is passed from the bottom portion of the fractionation column 12 via conduit 20. The overhead vapor product stream is passed from the top portion of the fractionation column 12 via conduit 22 to the inlet port 24 of the condenser 14. The overhead product vapor stream is passed through the condenser 14 where it is substantially completely condensed and the resulting overhead product condensate stream is passed from the outlet port 26 of the condenser 14 to the inlet port 28 of the accumulator 16 via conduit 30. At least a portion of the overhead product condensate is passed in the form of liquid product from the first outlet port 32 of the accumulator 16 via conduit 33, a heat exchanger 34, a diisopropanolamine unit 35 and overhead product control valve 36 interposed in the conduit 33 to a suitable storage point or to a point for further processing.

At least a portion of the liquid overhead product condensate is withdrawn from the accumulator 16 through a second outlet port 38 and is passed via conduit 40, pump 42 and conduit 44 into an upper portion of the fractionation column 12 as external reflux therefor.

The fractionation column pressure is continuously measured by a pressure sensor or transducer 46 which establishes and delivers a continuous fractionation column pressure signal representative of the thus sensed pressure to a pressure recording controller 48 via suitable means such as a pneumatic conduit 50, and further establishes and delivers a similar continuous signal indicative of the fractionation column pressure to a suitable digital computer processor as will be described in detail hereafter. The pressure recording controller 48 is operatively connected by suitable means such as a pneumatic conduit 52 to the overhead product control valve 36 which is controlled thereby. An overhead liquid product temperature indicator in the form of a temperature sensor or transducer 54 is connected to conduit 33 and is adapted for providing and delivering a continuous overhead liquid product temperature signal, representative of the temperature of the liquid product entering the diisopropanolamine unit 35, to a suitable computer processor which will be described in detail hereinafter.

A suitable analyzer 56 is connected to the conduit 30 for continuously monitoring analyzing the composition of the overhead product condensate stream and delivering a continuous series of analysis signals each representative of the analyzed composition of the overhead condensate stream components and the mol constituent ratios thereof to a suitable computer for further processing. It will be understood, however, that such an analyzer could also be connected to conduit 22 to perform the same function. The analyzer 56 is preferably a gas chromatographic analyzer. The chromatographic analyzer is preferably an online process analyzer which permits the analysis of the overhead product stream on a continuing or repeating basis.

A suitable temperature transducer 58 is connected to the conduit 30 and provides means for sensing the temperature of the overhead product condensate stream and delivering a continuous condensate temperature signal representative of the thus sensed temperature to the computer. The transducer 58 is connected by suitable conduit 60 to a condensate temperature controller 62. The condensate temperature controller 62 is operatively connected by suitable means such as a pneumatic conduit 64 to a variable pitch condenser fan blade unit 66. A fan pitch transducer 68 is operatively connected to the controller 62 as by fluid communication with the conduit 64 and provides means for sensing the pitch of the fan blades of the condenser fan blade unit 62 and delivering a continuous fan pitch signal representative of the thus sensed fan pitch to the computer.

Referring now to FIG. 2, a computer processor 70 is schematically illustrated therein which provides means for automatically controlling the condenser subcooling offset or condenser loading and the fractionation column pressure of the fractionator system 10 in response to the condensate temperature signal from the temperature transducer 58, the fractionation column pressure signal from the pressure transducer 46, the series of analysis signals from the analyzer 56, the fan pitch signal from the fan pitch transducer 68, the overhead liquid product temperature signal from the overhead liquid product temperature transducer 54, a predetermined degrees subcooling set point input, and a predetermined percentage of maximum fan pitch set point input. The computer processor 70 utilizes the fractionation column pressure signal input and the condensate analysis signal input to determine the bubble point of the overhead product condensate. The bubble point temperature of a given liquid mixture at a definite pressure is characterized by the condition $$\Sigma y_i = 1$$

where the y value for each component is evaluated from the equation $$y_k = K_k x_k$$

where:
- $y_k$ is the mol fraction of a component in the vapor phase;
- $x_k$ is the mol fraction of a component in the liquid phase; and
- $K_k$ is the equilibrium constant (the ratio of the mol fraction of a component in the gas and liquid phases).

The bubble point calculation performed by the computer is characterized by a trial-and-error procedure to obtain a solution. In performing this calculation the computer initially selects a trial temperature. The condensate analysis signal, fractionation column pressure signal and the trial temperature are then used by the computer to obtain the equilibrium constant value, K, for each component. The equilibrium constant value and the liquid mol fraction, $x_k$, for each component are then used to calculate the mol fraction, $y_k$, of each component in the vapor phase. The vapor phase mol fraction for all the components are then summed, and, if the summation of the vapor phase mol fractions is equal to 1.0, within a given tolerance, the bubble point temperature is thus determined as being the trial temperature initially selected by the computer. If the sum of the vapor phase mol fractions or "y" values of the components of the overhead product stream do not equal 1.0, within the predetermined tolerance, then a new trial temperature is selected and the calculation procedure is performed again.

Equilibrium constant or "K" data can be generated by the computer in several ways. Published ideal equilibrium constant values for each component to be found in the analysis can be curve fit by equations using constants, temperature and pressure. Methods are well known for "guessing" the trial temperature using a procedure which closes on the correct temperature rather than randomly selecting trial temperatures until such time as the correct temperature is selected. One such method is known as the Newton-Raphsom method. In the Newton-Raphsom method, a function "S" is defined as $$x_i K_i - 1.0,$$

where S=0 at the bubble point temperature. The new temperature, $T_{n+1}$ to be used in the trial-and-error bubble point calculation is determined by the equation:

$$T_{n+1} = T_n - S_n \left( \frac{T_n - T_{n-1}}{S_n - S_{n-1}} \right)$$

Thus each new trial temperature will be closer to the actual bubble point temperature than the temperature previously determined.

As shown in FIG. 2, the previously described calculations leading to the determination of each of a continuous series of bubble point temperatures are performed at 72 in response to the fractionation column pressure signal input and the condensate analysis signal input. The condensate temperature signal is directed to a summation block 74 which performs a subtraction of the actual condensate temperature from the calculated bubble point temperature. While the summation block 74 is preferably a digital device, it can be an analog device if desired. This calculated difference between the calculated bubble point temperature and the condensate temperature is then processed by a "degrees subcooling" proportional integral controller 76 as the process variable. The degrees subcooling set point input is directed to the controller 76. The degrees subcooling set point input provides the controller 76 with an input representative of a predetermined value of degrees of subcooling to achieve a desired safety margin and to assure total condensing of the overhead product vapor stream in the condenser 14. The controller 76 generates and delivers an appropriate condensate temperature controller set point to the condensate temperature controller 62. The output of the controller 62 alters the flow of air across the overhead product condenser 14 by controlling the variable pitch condenser fan blade unit to manipulate the fan blade pitch and thus obtain the desired condensate temperature corresponding to the predetermined "degrees subcooling".

The fan pitch signal from the fan pitch transducer 68 is input to the computer 70 as an indication of actual fan pitch. This fan pitch signal input is used as the process variable to the fan pitch proportional integral controller 78. The percentage of maximum fan pitch set point input to the controller 78 is representative of the desired predetermined percentage of maximum fan pitch at which the fractionator system 10 is to be operated. By operating the condenser fan at a fan pitch set point less than 100 percent maximum a margin of safety is provided so that the fan pitch controller 78 will be in an operating range at all times.

The fan pitch controller 78 generates and delivers an appropriate column pressure controller set point to the pressure recording controller 48. The pressure recording controller 48 controls the column pressure by manipulating the overhead product control valve 36 which, in turn, regulates the flow of liquid overhead product condensate from the liquid full accumulator 16.

The control system illustrated in FIG. 2 can be tailored to a particular column by adding various limits, alarms or message printouts. For example, the diisopropanolamine unit (DIPA) 35 is employed in the system 10 to remove acid gas from the overhead product stream. The DIPA unit 35 has a low temperature limit, due to the operational constraints, on the feed thereto. The continuous overhead liquid product temperature signal from the temperature transducer 54 is input to the computer 70 and used in a "high select" logic 80 along with the output from the fan pitch controller 78 to prevent the column pressure controller set point from dropping to a point which would result in a lowering of the column pressure to a value which would cause the overhead product temperature to fall below the DIPA unit low temperature limit on the feed thereto. An anti-reset windup logic 82 is included which is responsive to the column pressure set point for preventing the windup of the controller 78 when the overhead liquid product temperature is being selected by the "high select" logic 80 to limit the column pressure controller set point.

Although any suitable equipment can be utilized in implementing the apparatus and method of the invention, particularly preferred apparatus for use in conjunction with the fractionator system described herein is as follows:

| | |
|---|---|
| Pressure transducer 46 | Model 11 GM Pneumatic Pressure transmitter sold by the Foxboro Corporation, Foxboro, Mass. Pneumatic pressure signal is transduced by a Moore Products Co. pressure-to-current transducer model 781 T6 sold by Moore Products, Co., Spring House, Pa. |
| Pressure recording controller 48 | Model 130 K Pneumatic Controller sold by the Foxboro Corporation, Foxboro, Mass. |
| Overhead liquid product temperature transducer 54 | Uniform Thermocouple Temperature Reference Unit Model 320 sold by Applied Automation connected to a suitable thermocouple |
| Analyzer 56 | Model 2100 process chromatographic analyzer sold by Applied Automation, Bartlesville, Oklahoma 74004 |
| Temperature transducer 58 | Uniform Thermocouple Temperature Reference Unit Model 320 sold by Applied Automation, Inc. |
| Condensate temperature controller 62 | Model 130 K Pneumatic Controller sold by the Foxboro Corporation |
| Fan Pitch transducer 68 | Pressure-to-current transducer Model 781T6 sold by Moore Products Spring House, Pa. |
| Computer processor 70 | OPTROL ® 3600 Digital Computer sold by Applied Automation, Inc. |

In addition to the various control system modifications which will be apparent to those skilled in the art in view of the instant disclosure and claims, the apparatus and method of the invention are useful in a variety of process applications and in conjunction with a variety of process configurations. The invention can be extremely useful for any fractionation process in which fluctuation of temperature or column pressure capable of having a significant effect on the column product composition will be encountered. In addition, other variations and modifications by those skilled in the art are considered to be within the scope of the foregoing specification and of the claims appended hereto.

That which is claimed is:

1. Apparatus comprising:

fractionation column means for receiving at least one feed material stream and delivering an overhead product vapor stream from the top portion thereof;

pressure transducer means for sensing the pressure within said fractionation column means and delivering a fractionation column pressure signal representative of the thus sensed pressure;

first conduit means in flow communication with the top portion of said fractionation column means for providing a path for flow of said overhead product vapor stream therethrough;

condenser means in flow communication with said first conduit means for providing a path for flow of said overhead product stream therethrough and condensing at least a portion of said overhead product vapor stream passing therethrough so as to provide an overhead product condensate stream emanating from said condenser means;

variable pitch condenser fan blade means for directing air over said condenser means;

second conduit means in flow communication with said condenser means for providing a path for flow of said overhead product condensate stream therethrough;

first temperature transducer means for sensing the temperature of said overhead product condensate stream and delivering a condensate temperature signal representative of the thus sensed temperature;

analyzer means for analyzing the composition of said overhead product and delivering an analysis signal representative of the thus analyzed composition of said overhead product components;

accumulator means having an inlet port and at least one outlet port, said inlet port being in flow communication with said second conduit means for receiving said overhead product condensate stream and accumulating a quantity of said overhead product condensate therein;

third conduit means in flow communication with an outlet port of said accumulator means for providing a path for flow of overhead product condensate, said third conduit means including control valve means interposed therein for controlling the flow of overhead product condensate therethrough so as to control the fractionation column pressure;

fourth conduit means in flow communication with an outlet port of said accumulator means and in flow communication with said fractionation column means for providing a path for flow of overhead product condensate from said accumulator means to said fractionation column means;

pressure controller means operatively connected to said control valve means and responsive to a column pressure controller set point signal and to said fractionation column pressure signal for controlling said control valve means;

means responsive to said fractionation column pressure signal and to said analysis signal for determining the bubble point temperature of said overhead product stream and delivering a bubble point temperature signal representative of the thus determined bubble point temperature;

means responsive to said condensate temperature signal and to said bubble point temperature signal for determining the difference between the determined bubble point temperature and the overhead product condensate stream temperature and delivering a temperature difference signal representative of the thus determined difference between the determined bubble point temperature and the overhead product condensate stream temperature;

condensate temperature controller means operatively connected to said variable pitch condenser fan blade means and responsive to a condensate temperature controller set point signal and to said condensate temperature signal for controlling the pitch of said variable pitch condenser fan blade means;

means responsive to a degrees subcooling set point signal representative of a desired margin of subcooling of said overhead product condensate stream and to said temperature difference signal for determining a desired condensate temperature controller set point and delivering a condensate temperature controller set point signal representative of the thus determined condensate temperature controller set point to said condensate temperature controller means;

fan pitch transducer means responsive to said variable pitch condenser fan blade means for sensing the pitch thereof and delivering a fan pitch signal representative of the thus sensed pitch; and means responsive to a percentage of maximum fan pitch set point signal representative of a desired percentage of maximum pitch of said variable pitch condenser fan blade means and to a fan pitch signal from said fan pitch transducer means for determining a desired column pressure controller set point and delivering a column pressure set point signal representative of the thus determined column pressure controller set point to said pressure controller means.

2. In a fractionator system of the type which includes:

fractionation column means for receiving at least one feed material stream and delivering an overhead product vapor stream from the top portion thereof;

first conduit means in flow communication with the top portion of said fractionation column means for providing a path for flow of said overhead product vapor stream therethrough;

condenser means in flow communication with said first conduit means for condensing at least a portion of the vapors in said overhead product vapor stream passing therethrough so as to provide an overhead product condensate stream emanating from said condenser means;

second conduit means in flow communication with said condenser means for providing a path for flow of said overhead product condensate stream therethrough;

accumulator means having an inlet port and at least one outlet port, said inlet port being in flow communication with said second conduit means for receiving said overhead product condensate stream and accumulating a quantity of overhead product condensate therein;

third conduit means in flow communication with an outlet port of said accumulator means for providing a path for flow of overhead product condensate therethrough;

fourth conduit means in flow communication with an outlet port of said accumulator means and in flow communication with said fractionation column means for providing a path for flow of overhead product condensate from said accumulator means to said fractionation column means; the improvement comprising:

pressure transducer means for sensing the pressure within said fractionation column means and delivering a fractionation column pressure signal representative of the thus sensed pressure;

temperature transducer means for sensing the temperature of said overhead product condensate stream and delivering a condensate temperature signal representative of the thus sensed temperature;

analyzer means for analyzing the composition of said overhead product and delivering an analysis signal representative of the thus analyzed composition of said overhead product components;

control valve means interposed in said third conduit means for controlling the flow of overhead product condensate therethrough so as to control the fractionation column pressure;

pressure controller means operatively connected to said control valve means and responsive to a column pressure set point signal and to said fractionation column pressure signal for controlling said control valve means;

means responsive to said fractionation column pressure signal and to said analysis signal for determining the bubble point temperature of said overhead product stream and delivering a bubble point temperature signal representative of the thus determined bubble point temperature;

means responsive to said condensate temperature signal and to said bubble point temperature signal for determining the difference between the determined bubble point temperature and the overhead product condensate stream temperature and delivering a temperature difference signal representative of the thus determined difference between the determined bubble point temperature and the overhead product condensate stream temperature; and means responsive to a degrees subcooling set point signal representative of a desired margin of subcooling of said overhead product condensate stream and to said temperature difference signal for determining a desired column pressure set point and delivering a column pressure set point signal representative of the thus determined column pressure set point to said pressure controller means.

3. Apparatus in accordance with claim 1 or claim 2 wherein said analyzer means comprises a chromatographic analyzer.

4. Apparatus in accordance with claim 1 or claim 2 wherein said analyzer means is characterized further to include a gas chromatographic analyzer communicating with and adapted to analyze said overhead product condensate stream.

5. Apparatus in accordance with claim 1 or claim 2 wherein said means responsive to said fractionation column pressure signal and to said analysis signal is characterized further to include a digital computer.

6. Apparatus in accordance with claim 1 or claim 2 wherein said means responsive to said fractionation column pressure signal and to said analysis signal, said means responsive to said condensate temperature signal and to said bubble point temperature signal, and said means responsive to a degrees subcooling set point signal representative of a desired margin of subcooling of said overhead product condensate stream and to said temperature difference signal comprise at least a portion of a digital computer.

7. A method of controlling the fractionation column pressure of a fractionator system of the type which includes:

fractionation column means for receiving at least one feed material stream and delivering an overhead product vapor stream from the top portion thereof;

first conduit means in flow communication with the top portion of said fractionation column means for providing a path for flow of said overhead product vapor stream therethrough;

condenser means in flow communication with said first conduit means for condensing at least a portion of the vapors in said overhead product stream passing therethrough so as to provide an overhead product condensate stream emanating from said condenser means;

variable pitch condenser fan blade means for directing air over said condenser means;

second conduit means in flow communication with said condenser means for providing a path for flow of said overhead product condensate stream therethrough;

accumulator means in flow communication with said second conduit means for receiving said overhead product condensate stream and accumulating a quantity of said overhead product condensate therein;

third conduit means in flow communication with said accumulator means for providing a path for flow of overhead product condensate therethrough;

fourth conduit means in flow communication with said accumulator means and in flow communication with said fractionation column means for providing a path for flow of overhead product condensate from said accumulator means to said fractionation column means; comprising the steps of:

establishing a fractionation column pressure signal representative of the pressure within the fractionation column means;

establishing a condensate temperature signal representative of the temperature of the overhead product condensate stream;

establishing an analysis signal representative of the composition of the overhead product stream components;

establishing a degrees subcooling set point representative of a desired margin of subcooling of the overhead product condensate stream;

passing an overhead product vapor stream from said fractionation column means to said condenser means via said first conduit means;

condensing at least a portion of said overhead product vapor stream in said condenser means so as to produce an overhead product condensate stream;

passing the thus produced overhead product condensate stream from said condenser means to said accumulator means via said second conduit means so as to accumulate a quantity of overhead product condensate in said accumulator means;

passing a first portion of said overhead product condensate from said accumulator means via said third conduit means;

passing a second portion of said overhead product condensate from said accumulator means to said fractionation column means via said fourth conduit means; and controlling the pitch of said variable pitch condenser fan blade means and controlling said fractionation column pressure in response to said fractionation column pressure signal, said condensate temperature signal, said analysis signal and said degrees subcooling set point.

8. A method in accordance with claim 7 wherein said step of controlling the pitch of said variable pitch condenser fan blade means and controlling said fractionation column pressure is characterized further to include the steps of:

determining the bubble point temperature of said overhead product stream in response to said analysis signal and said fractionation column pressure signal and establishing a bubble point temperature signal representative thereof;

establishing a temperature difference signal in response to the thus established bubble point temperature signal and the condensate temperature signal;

establishing a condensate temperature controller set point in response to said thus established temperature difference signal and said degrees subcooling set point;

controlling the pitch of said variable pitch condenser fan blade means in response to said thus established condensate temperature controller set point so as to maintain said desired margin of subcooling of the overhead product condensate stream;

establishing a fan pitch signal representative of the pitch of said variable pitch condenser fan blade means;

establishing a percentage of maximum fan pitch set point representative of a desired operating pitch of said variable pitch condenser fan blade means;

establishing a column pressure controller set point in response to said fan pitch signal and said percentage of maximum fan pitch set point; and controlling said fractionation column pressure in response to said thus established column pressure controller set point.

9. A method in accordance with claim 8 wherein said step of controlling said fractionation column pressure in response to said thus established column pressure controller set point is characterized by controlling the flow of overhead product condensate from said accumulator means via said third conduit means.

10. A method in accordance with claim 9 wherein said fractionation column pressure is increased by reducing the flow of overhead product condensate via said third conduit means and, alternately, said fractionation column pressure is decreased by increasing the flow of overhead product condensate via said third conduit means.

11. A method of continuously controlling the fractionation column pressure of a fractionator system of the type which includes:

fractionation column means for receiving at least one feed material stream and delivering an overhead product vapor stream from the top portion thereof;

first conduit means in flow communication with the top portion of said fractionation column means for providing a path for flow of said overhead product vapor stream therethrough;

condenser means in flow communication with said first conduit means for providing a path for flow of said overhead product stream and condensing substantially all of the vapors in said overhead product stream passing therethrough so as to provide an overhead product condensate stream emanating from said condenser means;

variable pitch condenser fan blade means for directing air over said condenser means;

second conduit means in flow communication with said condenser means for providing a path for flow of said overhead product condensate stream therethrough;

accumulator means in flow communication with said second conduit means for receiving said overhead product condensate stream and accumulating a quantity of said overhead product condensate therein;

third conduit means in flow communication with said accumulator means for providing a path for flow of overhead product condensate therethrough; and fourth conduit means in flow communication with said accumulator means an in flow communication with said fractionation column means for providing a path for flow of overhead product condensate from said accumulator means to said fractionation column means; comprising the steps of:

establishing a continuous fractionation column pressure signal representative of the pressure within the fractionation column means;

establishing a continuous condensate temperature signal representative of the temperature of the overhead product condensate stream;

establishing a continuous series of analysis signals each representative of the composition of the overhead product stream components;

establishing a degrees subcooling set point representative of a desired margin of subcooling of the overhead product condensate stream;

passing an overhead product vapor stream from said fractionation column means to said condenser means via said first conduit means;

condensing substantially all of said overhead product vapor stream in said condenser means so as to produce an overhead product condensate stream;

passing the overhead product condensate stream from said condenser means to said accumulator means via said second conduit means so as to accumulate a quantity of overhead product condensate in said accumulator means;

passing a first portion of said overhead product condensate from said accumulator means via said third conduit means;

passing a second portion of said overhead product condensate from said accumulator means to said fractionation column means via said fourth conduit means; and controlling the pitch of said variable pitch condenser fan blade means and controlling said fractionation column pressure in response to said continuous fractionation column pressure signal, said continuous condensate temperature signal, said continuous series of analysis signals and said degrees subcooling set point.

12. A method in accordance with claim 11 wherein said step of controlling the pitch of said variable pitch condenser fan blade means and controlling said fractionation column pressure is characterized further to include the steps of:

continuously determining the bubble point temperature of said overhead product stream in response to said continuous series of analysis signals and said continuous fractionation column pressure signal and establishing a continuous series of bubble point temperature signals representative thereof;

continuously determining the difference each thus established bubble point temperature signal and the corresponding condensate temperature signal and establishing a temperature difference signal representative thereof;

establishing a condensate temperature controller set point in response to each thus established temperature difference signal and said degrees subcooling set point;

continuously controlling the pitch of said variable pitch condenser fan blade means in response to each thus established condensate temperature controller set point so as to maintain said desired margin of subcooling of the overhead product condensate stream;

establishing a continuous fan pitch signal representative of the pitch of said variable pitch condenser fan blade means;

establishing a continuous percentage of maximum fan pitch set point representative of a desired operating pitch of said variable pitch condenser fan blade means;

establishing a continuous column pressure controller set point in response to said fan pitch signal and said percentage of maximum fan pitch set point; and continuously controlling said fractionation column pressure in response to said thus established column pressure controller set point.

13. A method in accordance with claim 12 wherein said step of continuously controlling said fractionation column pressure in response to said thus established column pressure set point is characterized by controlling the flow overhead product condensate from said accumulator means via said third conduit means.

14. A method in accordance with claim 13 wherein said fractionation column pressure is increased by reducing the flow of overhead product condensate via said third conduit means and, alternately, said fractionation column pressure is decreased by increasing the flow of overhead product condensate via said third conduit means.

* * * * *

UNITED STATES PATENT AND TRADEMARK OFFICE
CERTIFICATE OF CORRECTION

PATENT NO. : 4,167,455
DATED : September 11, 1979
INVENTOR(S) : William B. Bard

It is certified that error appears in the above-identified patent and that said Letters Patent are hereby corrected as shown below:

Column 8, claim 2, line 1, after "of" and before "overhead" insert --- said ---.

Column 11, claim 11, line 37, after "means" and before "in" change "an" to --- and ---.

Column 12, claim 12, line 27, after "difference" and before "each" insert --- between ---.

Signed and Sealed this

Seventh Day of April 1981

[SEAL]

Attest:

RENE D. TEGTMEYER

Attesting Officer

Acting Commissioner of Patents and Trademarks